United States Patent [19]

Fedison, Jr.

[11] Patent Number: 5,756,890
[45] Date of Patent: May 26, 1998

[54] SNAP MOUNT THROTTLE POSITION SENSOR

[75] Inventor: Walter William Fedison, Jr., Ortonville, Mich.

[73] Assignee: Ford Global Technologies, Inc., Dearborn, Mich.

[21] Appl. No.: 565,136

[22] Filed: Nov. 30, 1995

[51] Int. Cl.⁶ .................................................. G01M 15/00
[52] U.S. Cl. ............................................ 73/118.1; 73/118.2
[58] Field of Search ............................. 73/116, 117.2, 73/117.3, 118.1, 118.2, 202.5, 204.11, 204.14, 204.17, 204.22, 866.5

[56] References Cited

U.S. PATENT DOCUMENTS

| | | |
|---|---|---|
| 3,616,780 | 11/1971 | Helle. |
| 4,205,377 | 5/1980 | Oyama et al. ............... 364/431.01 |
| 4,308,838 | 1/1982 | Nakano et al. ..................... 123/492 |
| 4,430,634 | 2/1984 | Hufford et al. ..................... 338/164 |
| 4,539,963 | 9/1985 | Brisbane et al. ................... 123/494 |
| 4,592,326 | 6/1986 | Karino et al. ...................... 123/494 |
| 4,598,581 | 7/1986 | Brekke ................................. 73/117.3 |
| 4,616,504 | 10/1986 | Overcash et al. .................. 73/118.1 |
| 4,976,145 | 12/1990 | Kienzle et al. .................... 73/204.22 |
| 4,991,560 | 2/1991 | Arai et al. ........................... 123/494 |
| 5,035,214 | 7/1991 | Daly et al. .......................... 123/337 |
| 5,319,962 | 6/1994 | Kaminski et al. .................... 73/116 |
| 5,485,746 | 1/1996 | Mori et al. ......................... 73/204.22 |

FOREIGN PATENT DOCUMENTS 0501514  2/1992  European Pat. Off..
2280492  7/1994  United Kingdom.

*Primary Examiner*—George M. Dombroske
*Attorney, Agent, or Firm*—Donald A. Wilkinson

[57] ABSTRACT

A Throttle body assembly (10) is provided for use in the air intake system of an internal combustion engine. The throttle body assembly includes a plastic throttle body housing (12) and a throttle position sensor (26) mounted thereto. The housing (12) and throttle position sensor (26) each have a mounting flange (20, 30), with one flange telescopically insertable into a pocket in the other flange. A snap fit mechanism will securely hold the two mounting flanges together in the proper orientation.

15 Claims, 2 Drawing Sheets

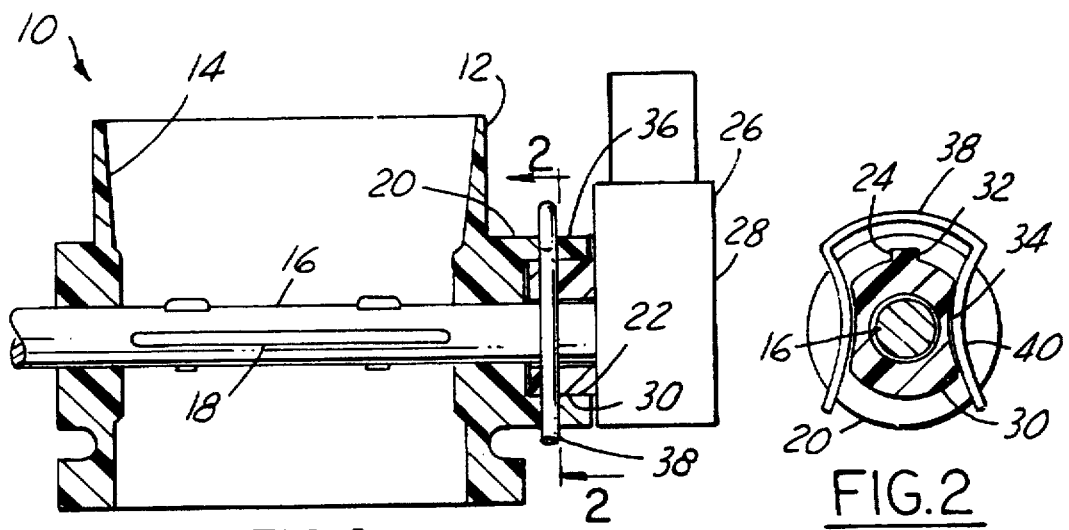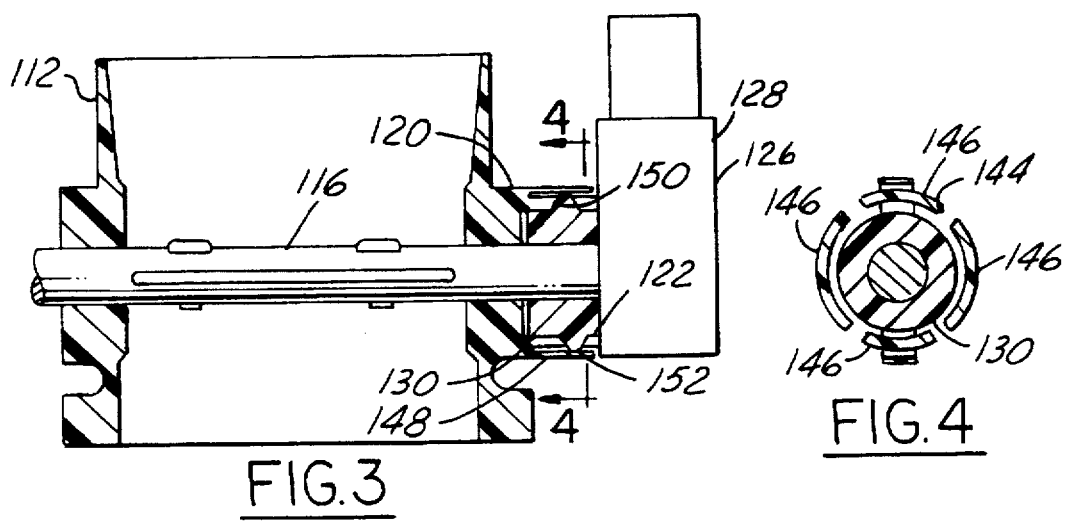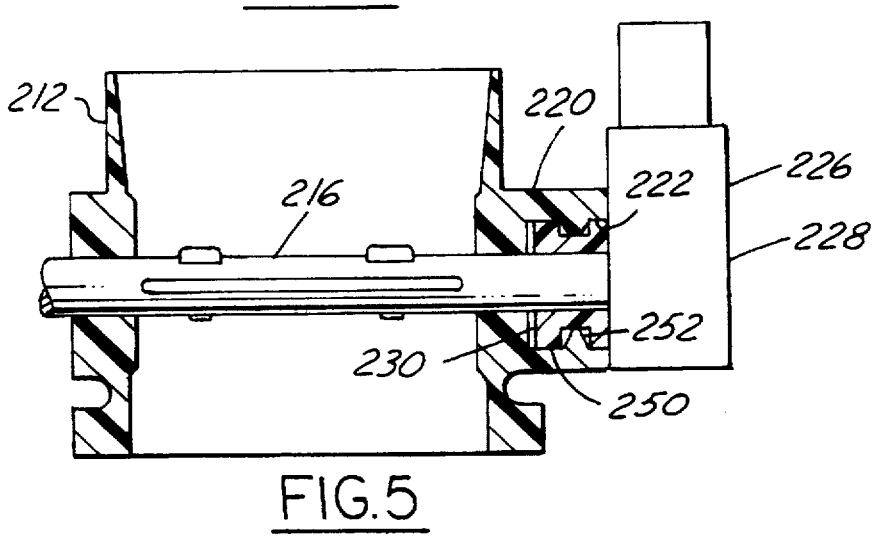

SNAP MOUNT THROTTLE POSITION SENSOR

FIELD OF THE INVENTION

The present invention relates to throttle position sensors that mount to throttle bodies used in the air induction system of an internal combustion engine.

BACKGROUND OF THE INVENTION

Conventional throttle bodies are made of metal, which limits the ability to fabricate the throttle body to the exact shape desired at a reasonable cost. In order to allow for more flexibility in design and to reduce weight of the throttle bodies, some high temperature plastics are now being considered. While the cost of the plastic is more than the cost of traditional metal throttle bodies, the design needs now outweigh the cost increase.

A typical throttle body has a throttle position sensor mounted thereto in order to continuously determine the throttle position and relay this information to an engine computer. It is important that the position sensor is accurately positioned relative to the housing so that it produces accurate readings of the throttle valve position during engine operation. It is also important that the throttle position sensor is securely mounted to the housing so that it does not create unwanted noises from vibrations.

For a conventional metal throttle body, the throttle position sensor includes two flanges with holes through each one and is fastened to the throttle body with a pair of threaded fasteners that extend through the holes in the flanges, and the throttle body includes threaded bores machined into the part to receive the fasteners.

For throttle position sensors now mounted to plastic throttle bodies, in order for the throttle position sensors to securely fasten to the throttle body, the plastic throttle body has to have metal inserts molded into it where the position sensor will mount. This adds to the expense of molding and also still requires an assembly time that includes the time needed for someone to thread the fasteners into the threaded holes.

Thus, there is a desire to allow for a secure and accurate mounting of a throttle position sensor to a plastic throttle body quickly and easily, that will allow for a removable attachment and will not require the expense of metal inserts molded into the plastic of the throttle body.

SUMMARY OF THE INVENTION

In its embodiments, the present invention contemplates a throttle body for use in the air intake system of an internal combustion engine. The throttle body comprises a throttle shaft, a throttle body housing having a main bore through which the throttle shaft extends, and a housing mounting flange protruding from the housing about one end of the throttle shaft, with the housing mounting flange including at least one pocket. The throttle body further comprises a throttle position sensor, including a sensor mounting flange sized to be insertable within the at least one pocket of the housing mounting flange; with one of the sensor mounting flange and housing mounting flange including a protruding mounting mechanism, and the other of the sensor mounting flange and the housing mounting flange having corresponding recessed mounting means for receiving and securing the mounting mechanism therein when the sensor mounting flange has been moved telescopically into the housing mounting flange.

Accordingly, an object of the present invention is to provide a throttle position sensor that quickly and easily mounts to a plastic throttle body without requiring molding in or insertion of metal inserts in the plastic throttle body nor flanges on the throttle position sensor for receiving the fasteners.

An advantage of the present invention is that the throttle position sensor can be quickly and securely installed without the need for threaded fasteners, eliminating the need for machining threads into the parts for this purpose, which also tends to reduce the weight of the assembly.

A further advantage of the present invention is a reduced cost of assembly by eliminating the need to install fasteners, while still allowing for accurate orientation of the sensor relative to the throttle body housing.

BRIEF DESCRIPTION OF THE DRAWINGS

FIG. 1 is a side, partial section view of a throttle body and throttle position sensor according to a first embodiment of the present invention;

FIG. 2 is a sectional view taken along line 2—2 in FIG. 1;

FIG. 3 is a side, partial section view similar to FIG. 1 illustrating a second embodiment of the present invention;

FIG. 4 is a sectional view taken along line 4—4 in FIG. 3;

FIG. 5 is a side, partial section view similar to FIG. 1 illustrating a third embodiment of the present invention;

DETAILED DESCRIPTION OF THE PREFERRED EMBODIMENTS

Figures 6, 7:
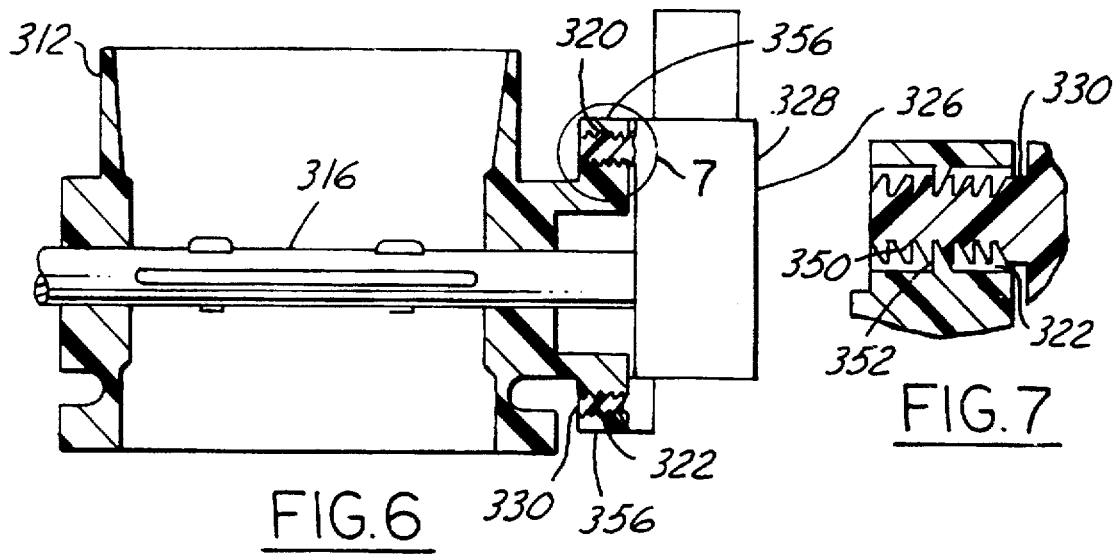
FIG. 6 is a side, partial section view similar to FIG. 1 illustrating a fourth embodiment of the present invention.
FIG. 7 is an enlarged view taken from encircled area 7 in FIG. 6.

FIGS. 1 and 2 illustrate a first embodiment of the present invention. A throttle body assembly 10 includes a throttle body housing 12 having a main bore 14. A conventional throttle shaft 16 extends through the main bore 14 and has a conventional butterfly valve plate 18 mounted to it. The housing 12 also includes a mounting flange 20, protruding from the housing 12 about one end of the throttle shaft 16. The mounting flange 20 includes a generally cylindrical pocket 22 through which the throttle shaft extends. The pocket 22 includes a locating groove 24 within its inner surface.

The throttle body assembly 10 also includes a throttle position sensor 26 having a main housing 28, with a generally cylindrical mounting flange 30 extending from the housing 28. The mounting flange 30 includes a locating tab 32 and is sized so that, when properly oriented, the mounting flange 30 will just fit within the pocket 22 and the locating tab 32 will just fit into the locating groove 24 as the throttle position sensor 26 is telescopically slid toward the throttle body housing 12.

The mounting flange 30 of the sensor 26 also includes two arcuate grooves 34, and the mounting flange 20 includes an end portion 36, having a larger outer diameter than the mounting flange 20 generally. The arcuate grooves 34 are located such that when the sensor mounting flange 30 is fully received within the housing mounting flange 20, the arcuate grooves 34 will be adjacent to the end portion 36.

A generally U-shaped retaining clip 38 includes a pair of curved arms 40. The retaining clip arms 40 can slip around the sensor mounting flange 30 by elastically deforming the clip 38 as it is pushed on. The arms 40 will then snap into place, matins with the arcuate grooves 34.

To mount the sensor, the sensor mounting flange 30 is telescopically inserted into the pocket 22, oriented so that the locating tab 32 aligns with the grooves 24. Then the retaining clip 38 is slipped around the two mounting flanges and snaps into place, with the arms 40 of the clip 38 slipping into the arcuate grooves 34.

The end portion 36 of the mounting flange 20 will prevent the throttle position sensor 26 from pulling away from the throttle body housing 12. Further, the locating tab 32 will prevent the throttle sensor from rotating relative to the throttle body housing 12 to assure the proper rotational orientation of the two. The close fit of the sensor mounting flange 30 within the pocket 22 of the housing mounting flange 20 will prevent lateral movement of the throttle position sensor 26 relative to the throttle body housing 12.

Disassembly then, is also very simple and quick. To disassemble, one would pull the retaining clip 38 off of the sensor flange 30, allowing the throttle position sensor 26 to telescopically slide away from the throttle body housing 12.

A second embodiment is illustrated in FIGS. 3 and 4. Elements in this embodiment that are similar to elements in the first embodiment will be similarly designated, but given 100 series numbers.

The throttle body housing 112 again includes a mounting flange 120 that protrudes therefrom about the throttle shaft 116, and the mounting flange 120 includes a generally cylindrical pocket 122, however, the configuration of the pocket 122 is different. The pocket 122 includes four longitudinal slots 144, creating four cantilevered arms 146 in the mounting flange 120. Further, generally centered about two of the arms 146 that are opposite one another is a pair of release tabs 148, and there is also a pair of recesses 150 through the wall of the pocket 122.

The throttle position sensor 126 again includes a housing 128 having a mounting flange 130 protruding therefrom. The mounting flange 130 is generally cylindrical and includes a pair of barbs 152, opposite one another, on its surface. The barbs 152 are oriented such that, when the mounting flange 130 is aligned with the pocket 122, each of the barbs 152 will generally align with a corresponding one of the recesses 150. The barbs 152 also extend out from the flange 130 farther than the inner diameter of the pocket 122.

Thus, when the mounting flange 130 is telescopically slid into the pocket 122, it will cause two of the cantilevered arms 146 to elastically flex outward. Once pushed in, the throttle position sensor 126 is rotated around relative to the throttle body housing until the barbs 152 align with the recesses 150, which will allow the cantilevered arms 146 to snap back into place trapping the barbs 152 in the recesses 150.

The barbs 152 mating with the recesses 150 will securely hold the throttle position sensor 126 fixed relative to the throttle body housing 112 and assure proper orientation of the two.

For disassembly of the throttle position sensor 126 from the throttle body housing 112, the release tabs 148 are pulled outward, which will, in turn, cause two of the cantilevered arms 146 to also move outwardly, pulling the recesses 150 away from the barbs 152. This will allow the mounting flange 130 to slide out of the pocket 122.

A third embodiment is shown in FIG. 5. This embodiment is similar to the second embodiment and similar elements will be similarly designated, but given 200 series numbers.

Again the throttle body housing 212 includes a mounting flange 220 that protrudes therefrom about the throttle shaft 216 with a generally cylindrical pocket 222. The pocket 222 includes a pair of barbs 252 protruding into the pocket 222 opposite one another.

The throttle position sensor 226 again includes a housing 228 having a mounting flange 230 protruding therefrom. The mounting flange 230 is generally cylindrical and includes a pair of recesses 250, opposite one another, in its surface. The recesses 250 are oriented such that, when the mounting flange 230 is aligned with the pocket 222, each of the recesses 250 will generally align with a corresponding one of the barbs 252.

Thus, when the mounting flanae 230 is telescopically slid into the pocket 222, it will cause the walls of mounting flange 220 to elastically flex outward. Once the throttle position sensor 226 is pushed in, then it is rotated around relative to the throttle body housing 212 until the barbs 252 align with the recesses 250, which will allow the wall of the mounting flange 220 to snap back into place, trapping the barbs 252 in the recesses 250.

The barbs 252 mating with the recesses 250 will securely hold the throttle position sensor 226 fixed relative to the throttle body housing 212 and assure proper orientation of the two.

For this embodiment a tool may be required to disassemble the two. Otherwise, release tabs could be incorporated as in the second embodiment.

FIGS. 6 and 7 illustrate a fourth embodiment of the present invention. Elements in this embodiment that are similar to elements in the previously discussed embodiments will be similarly designated, but given 300 series numbers. This embodiment employs what is known as a Christmas tree fastening type of arrangement.

The throttle body housing 312 includes a mounting flange 320 that protrudes therefrom about the throttle shaft 316. The mounting flange 320 includes a pair of extensions 356, each including a pocket 322. Each of the pockets 322 includes a barb 352 about its circumference protruding into the pocket 322.

The throttle position sensor 326 includes a housing 328 having a pair of mounting flanges 330 protruding therefrom. Each of the mounting flanges 330 is generally cylindrical and includes a series of recesses 350, adjacent to one another, on its surface. The mounting flanges 330 are spaced to align with the pockets 322. The recesses 350 are oriented such that, when each of the mounting flanges 330 is aligned with its respective pocket 322, the recesses 350 will generally align with the barbs 352. The mounting flanges 330 are telescopically slid into the pockets 322, causing the barbs 352 to elastically flex. Once pushed in, each of the barbs 352 will snap back into place, being trapping in one of the recesses 350.

Figure 8:
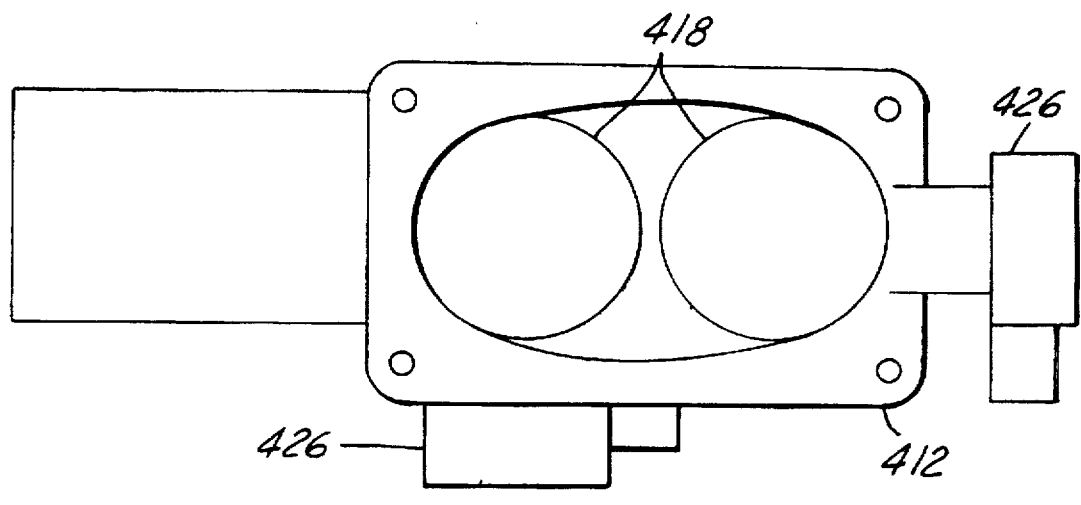
FIG. 8 is a schematic top view of a throttle body and position sensors in accordance with a fifth embodiment of the present invention.

A fifth alternate embodiment is illustrated in FIG. 8. This embodiment is similar to the previously described embodiments, with similar elements similarly designated, but given 400 series numbers.

In some engines today, a double butterfly valve 418 type of arrangement is employed within a throttle body housing 412. This may be, for example, where the engine includes a traction control module. There will then be two throttle position sensors 426, one mounted to sense the throttle body valve position and the other mounted to the traction assist valve portion of the housing 412 to sense the traction assist valve position. Any of the attachment configurations of the first four embodiments can be employed here. This embodiment illustrates that the above embodiments can be employed to further increase the cost savings with current engines employing more complex systems requiring additional throttle position sensors.

While certain embodiments of the present invention have been described in detail, those familiar with the art to which this invention relates will recognize various alternative designs and embodiments for practicing the invention. For example, the mounting flanges for the throttle body housing and the throttle position sensor can be reversed, with the mounting flange on the sensor having the pocket into which the housing mounting flange telescopically slides. Accordingly, it is intended that the scope of the invention be limited only by the following claims.

I claim:

1. A throttle body for use in the air intake system of an internal combustion engine comprising:
    a throttle shaft;
    a throttle body housing having a main bore through which the throttle shaft extends, and a housing mounting flange protruding from the housing about one end of the throttle shaft, with the housing mounting flange including at least one pocket; and
    a throttle position sensor, including a sensor mounting flange sized to be insertable within the at least one pocket of the housing mounting flange; with one of the sensor mounting flange and housing mounting flange including a protruding mounting mechanism, and the other of the sensor mounting flange and the housing mounting flange having corresponding recessed mounting means for receiving and securing the mounting mechanism therein when the sensor mounting flange has been moved telescopically into the housing mounting flange.

2. The throttle body of claim 1 wherein the housing mounting flange is generally cylindrical and includes the protruding mounting mechanism which is comprised of an end portion of a larger diameter; the sensor mounting flange is generally cylindrical; and the recessed mounting means comprises a pair of arcuate grooves located radially about the sensor mounting flange surface and a generally U-shaped retaining clip, with the retaining clip having arms that elastically deform when pushed into the arcuate grooves.

3. The throttle body of claim 2 wherein the pocket includes a locating groove and the sensor mounting flange includes a locating tab that is telescopically slidable within the locating groove when the sensor mounting flange is received within the pocket.

4. The throttle body of claim 1 wherein the housing mounting flange includes the recessed mounting means, which is comprised of a plurality of recesses within the pocket; and the sensor mounting flange includes the protruding mounting mechanism, which includes a plurality of barbs extending from the sensor mounting flange, located to align with the recesses when the sensor is oriented properly relative to the throttle body housing.

5. The throttle body of claim 4 wherein the housing mounting flange includes a plurality of slots forming a plurality of flex arms wherein the barbs will cause the flex arms to move elastically outward when the barbs are not aligned with the recesses.

6. The throttle body of claim 5 wherein the housing mounting flange further includes release means for flexing the flex arms outward, allowing the barbs to be pulled form the recesses during disassembly of the sensor from the throttle body housing.

7. The throttle body of claim 1 wherein the sensor mounting flange includes the recessed mounting means, which is comprised of a plurality of recesses and the housing mounting flange includes the protruding mounting mechanism, which includes a plurality of barbs extending from the pocket of the housing mounting flange located to align with the recesses when the sensor is oriented properly relative to the throttle body housing.

8. The throttle body of claim 1 wherein the sensor mounting flange includes the recessed mounting means, which is comprised of a plurality of circumferentially oriented recesses adjacent to one another; and the housing mounting flange includes the protruding mounting mechanism, which includes a circumferential barb extending from the pocket of the housing mounting flange.

9. The throttle body of claim 8, including a second sensor mounting flange, and wherein the recessed mounting means further comprises a second plurality of recesses adjacent to one another on the second sensor mounting flange; and a second housing mounting flange having a second pocket where the protruding mounting mechanism further comprises a second circumferential barb extending from the second pocket of the second housing mounting flange.

10. The throttle body of claim 1 wherein the throttle body housing includes a second main bore and a second housing mounting flange protruding from the housing and a second throttle position sensor including a second sensor mounting flange, with one of the second sensor mounting flanges and second housing mounting flanges including a second protruding mounting mechanism, and the other of the second sensor mounting flange and the second housing mounting flange having a corresponding second recessed mounting means for receiving and securing the second mounting mechanism therein when the second sensor mounting flange has been moved telescopically into the second housing mounting flange.

11. A throttle body for use in the air intake system of an internal combustion engine comprising:
    a throttle shaft;
    a plastic throttle body housing having a main bore through which the throttle shaft extends, and a generally cylindrical plastic housing mounting flange protruding from the housing about one end of the throttle shaft, with the housing mounting flange including at least one pocket and a protruding mounting mechanism having an end portion of a larger diameter;
    a throttle position sensor, including a generally cylindrical sensor mounting flanqe sized to be insertable within the at least one pocket of the housing mounting flange and including a pair of arcuate grooves located radially about the sensor mounting flange; and
    a generally U-shaped retaining clip, with the retaining clip having arms that elastically deform when pushed into the arcuate grooves, for receiving and securing the mounting mechanism therein when the sensor mounting flange has been moved telescopically into the housing mounting flange.

12. The throttle body of claim 11 wherein the pocket includes a locating groove and the sensor mounting flange includes a locating tab that is telescopically slidable within the locating groove when the sensor mounting flange is received within the pocket.

13. A throttle body for use in the air intake system of an internal combustion engine comprising:
    a throttle shaft;
    a plastic throttle body housing having a main bore through which the throttle shaft extends, and a plastic housing mounting flange protruding from the housing about one end of the throttle shaft, with the housing mounting flange including at least one pocket;

a throttle position sensor, including a sensor mounting flange sized to be insertable within the at least one pocket of the housing mounting flange; with one of the sensor mounting flange and housing mounting flange including a protruding mounting mechanism, which includes a plurality of barbs extending therefrom, and the other of the sensor mounting flange and the housing mounting flange having corresponding recessed mounting means, including a plurality of recesses, for receiving and securing the mounting mechanism therein when the sensor mounting flange has been moved telescopically into the housing mounting flange and oriented so that the barbs align with the recesses.

14. The throttle body of claim 13 wherein the housing mounting flange includes a plurality of slots forming a plurality of flex arms wherein the barbs will cause the flex arms to move elastically outward when the barbs are not aligned with the recesses.

15. The throttle body of claim 14 wherein the housing mounting flange further includes release means for flexing the flex arms outward, allowing the barbs to be pulled form the recesses during disassembly of the sensor from the throttle body housing.

* * * * *